United States Patent
Chen et al.

(10) Patent No.: US 10,764,649 B2
(45) Date of Patent: Sep. 1, 2020

(54) FALLING BACK FROM THREE-DIMENSIONAL VIDEO

(75) Inventors: Jin-Yue Chen, Beijing (CN); Xiao-Mei He, Beijing (CN)

(73) Assignee: Google Technology Holdings LLC, Mountain View, CA (US)

(*) Notice: Subject to any disclaimer, the term of this patent is extended or adjusted under 35 U.S.C. 154(b) by 264 days.

(21) Appl. No.: 14/422,171

(22) PCT Filed: Aug. 17, 2012

(86) PCT No.: PCT/CN2012/080308
§ 371 (c)(1),
(2), (4) Date: May 19, 2016

(87) PCT Pub. No.: WO2014/026380
PCT Pub. Date: Feb. 20, 2014

(65) Prior Publication Data
US 2016/0277807 A1    Sep. 22, 2016

(51) Int. Cl.
*H04N 21/6375* (2011.01)
*H04N 13/194* (2018.01)
(Continued)

(52) U.S. Cl.
CPC ....... *H04N 21/6375* (2013.01); *H04N 13/194* (2018.05); *H04N 13/359* (2018.05);
(Continued)

(58) Field of Classification Search
None
See application file for complete search history.

(56) References Cited

U.S. PATENT DOCUMENTS

| 6,118,759 A * | 9/2000 | Ohyoshi | H04L 47/115 370/225 |
| 2002/0126698 A1* | 9/2002 | Deshpande | H04J 3/1682 370/467 |

(Continued)

FOREIGN PATENT DOCUMENTS

| CA | 102265623 A | 11/2011 |
| CN | 101466038 A | 6/2009 |

(Continued)

OTHER PUBLICATIONS

IInternational Search Report for International Application No. PCT/CN2012/080308, dated May 23, 2013, 4 pages.

(Continued)

*Primary Examiner* — Michael R Telan
(74) *Attorney, Agent, or Firm* — Lowenstein Sandler LLP (57) ABSTRACT

Disclosed are techniques for allowing a fallback from downloading and presenting a three-dimensional (3D) media content item to a 2D version of the same content item. During the download, a triggering condition is noted, such as network congestion or resource starvation on the receiving device. The receiving device requests a fallback and then begins to receive the 2D version of the media content item. (Generally, the 2D content item is downloaded beginning at a point specified by the recipient device rather than from the beginning.) The 2D version is presented to the user of the recipient device in place of the 3D version. If the triggering condition is resolved, then the download and presentation can resume in 3D, either on the request of the recipient device or by the download server noting the resolution of the triggering condition.

22 Claims, 5 Drawing Sheets

(51) Int. Cl.
*H04N 13/359* (2018.01)
*H04N 21/81* (2011.01)
*H04N 21/2343* (2011.01)
*H04N 21/239* (2011.01)
*H04N 21/414* (2011.01)
*H04N 21/437* (2011.01)
*H04N 21/44* (2011.01)

(52) U.S. Cl.
CPC ... *H04N 21/2393* (2013.01); *H04N 21/23439* (2013.01); *H04N 21/41407* (2013.01); *H04N 21/437* (2013.01); *H04N 21/44004* (2013.01); *H04N 21/816* (2013.01)

(56) References Cited

U.S. PATENT DOCUMENTS

| | | | |
|---|---|---|---|
| 2005/0052992 A1* | 3/2005 | Cloonan | H04L 47/70 370/229 |
| 2005/0259147 A1 | 11/2005 | Nam et al. | |
| 2007/0113246 A1* | 5/2007 | Xiong | H04N 7/17318 725/39 |
| 2008/0120683 A1* | 5/2008 | Frazier | H04L 12/66 725/141 |
| 2008/0310499 A1* | 12/2008 | Kim | H04H 20/95 375/240.01 |
| 2011/0063411 A1* | 3/2011 | Kitazato | H04N 13/0059 348/42 |
| 2011/0176557 A1* | 7/2011 | Bae | H04N 21/23406 370/476 |
| 2012/0002717 A1* | 1/2012 | Ma | H04N 21/44209 375/240.01 |
| 2012/0046078 A1 | 2/2012 | Kim | |
| 2012/0154534 A1* | 6/2012 | Suh | H04N 21/4345 348/43 |
| 2013/0128956 A1* | 5/2013 | Bouillet | H04N 21/23439 375/240.02 |
| 2013/0329777 A1* | 12/2013 | Konda | H04L 67/04 375/240.01 |

FOREIGN PATENT DOCUMENTS

| | | |
|---|---|---|
| CN | 101917391 A | 12/2010 |
| CN | 102026008 A | 4/2011 |
| CN | 102224739 A | 10/2011 |
| CN | 102265623 A | 11/2011 |
| CN | 102377875 A | 3/2012 |
| CN | 102404593 A | 4/2012 |
| WO | 2008156949 A1 | 12/2008 |
| WO | 2011100735 A1 | 8/2011 |
| WO | 2014026380 A1 | 2/2014 |

OTHER PUBLICATIONS

International Search Report for International Application No. PCT/US2012/0080308, filed Aug. 17, 2012, dated May 23, 2013, 4 pages.

* cited by examiner

| 400 | Begin to transmit a 3D media content item. |

| 402 | Receive a request for a fallback to a 2D download of the media content item. |

| 404 | Either: |

| 404a | Begin to transmit a 2D version of the media content item. |

| 404b | Tell a 2D media server to begin to transmit the 2D version of the media content item. |

| 404c | Tell the download recipient to request a download of the 2D version of the media content item from the 2D media server |

| 406 | Note a resolution of the triggering condition. |

FIG. 4a

408  Resume transmitting the 3D version of the media content item.

FIG. 4b

FALLING BACK FROM THREE-DIMENSIONAL VIDEO

TECHNICAL FIELD

The present disclosure is related generally to digital communications and, more particularly, to transmitting digital video.

BACKGROUND

Industry reports show that viewers are spending more time than ever watching videos and using other media-delivery services. In response, new services are developed almost daily. Viewers have begun to use their personal communications devices (e.g., cellphones and tablet computers) to download and to view these media content items.

Downloads of media content items that include video require much more bandwidth than do audio-only or text-only downloads. Managing these downloads in a radio environment, where many user devices may compete for bandwidth, is an ongoing challenge. The challenge is made especially difficult when a user wishes to watch the video as it is being downloaded (rather than downloading for later viewing).

This download-bandwidth challenge is exasperated by the recent spread of three-dimensional (3D) video offerings. Because human beings naturally view the world in three dimensions, 3D video can be more appealing than traditional 2D video. Even smaller devices such as cellphones are appearing that can present 3D video (as well as 3D static images) to their users. However, 3D downloads naturally require more bandwidth than do 2D downloads, and presenting 3D media content items requires more storage space and more processing power on the user device.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Figure 1:
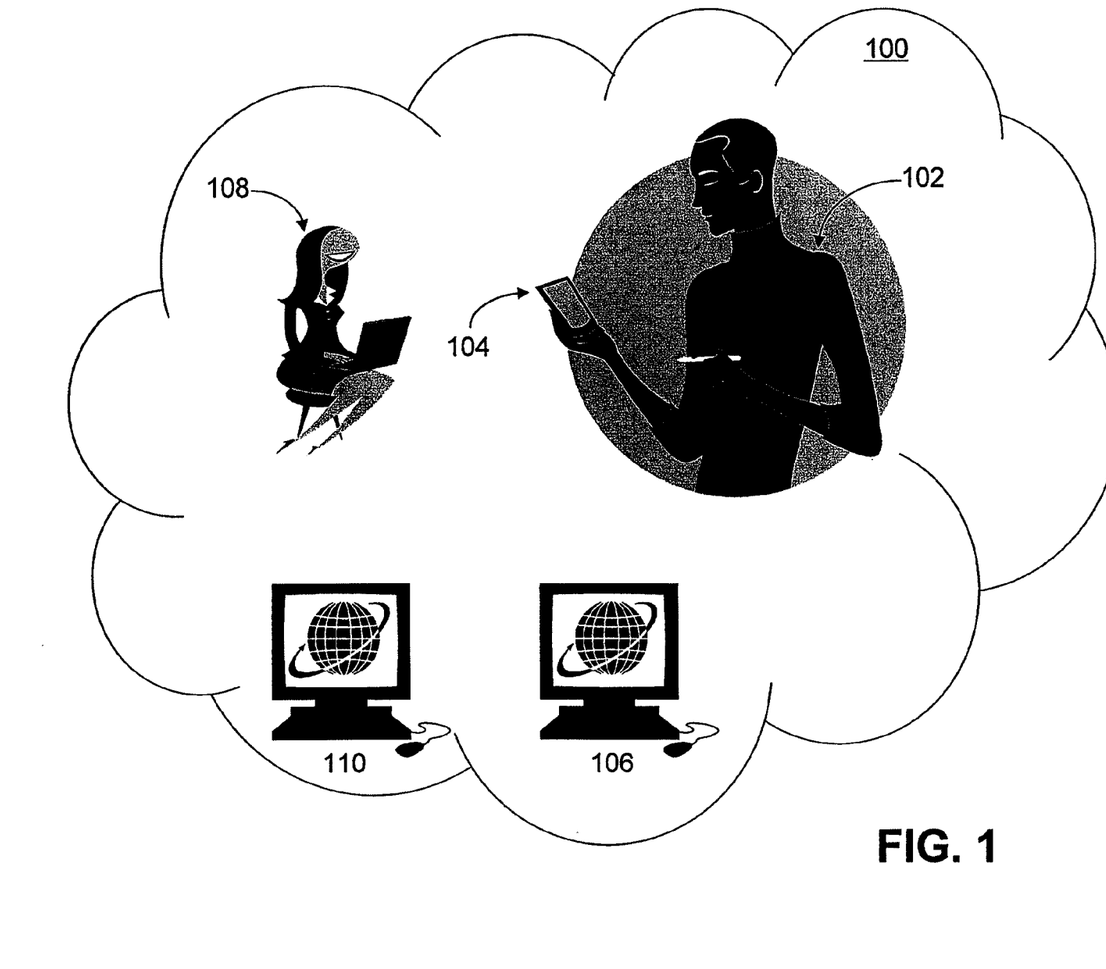
FIG. 1 is an overview of a representative environment in which the present techniques may be practiced.

In the representative communications environment 100 of FIG. 1, a user 102 uses his personal communications device 104 to perform various tasks such as accessing web sites, communicating with a friend 108, running web-based applications for work or pleasure, shopping, and recording health information. Of particular relevance to the present discussion, the user 102 may wish to download a 3D media content item to his device 104.

For purposes of the present discussion, the phrase "media content item" is meant to be taken very broadly. In addition to a movie, television program, music video, and the like, a media content item can be a game display, map, menu, a message (e.g., an e-mail, advertisement, or public-service alert), a web page, or a social-networking post. A 3D media content item is any content item that includes a 3D image, either moving or static.

(Simplistically, a 3D image can be thought of as two 2D images, captured simultaneously from two cameras separated by the distance between a viewer's two eyes. When the two images are displayed simultaneously, one to each eye of the viewer, they produce in the viewer the sensation of viewing a 3D scene. Because it is formed from two 2D images, a 3D image inherently requires more bandwidth to download than does a 2D image. Actual video-encoding techniques take advantage of image overlap and other techniques to decrease the amount of bandwidth required for a 3D image to a value that is often substantially less than twice the 2D bandwidth. However, it is still true that even with compression, 3D images require more bandwidth than do 2D images. They also require more storage and more processing power to decode and to display on the personal communications device 104.)

To start the download, the user 102 (via his personal communications device 104) sends a request to a 3D-media server 106. The 3D-media server 106 then begins downloading the 3D media content item. The user 102 may wish to view the 3D media content as it is downloaded to his personal communications device 104, or he may wish to store the content item for later viewing.

A condition may arise that disrupts the download. For a first example, the download bandwidth available to the personal communications device 104 may be restricted by noise in the communications environment 100 or by competition with other uses of the bandwidth, such as when another user 108 concurrently requests a media download. If the user 102 does is not viewing the media content item as it is being downloaded but is instead storing it for future use, then the personal communications device 104 may simply continue to download the media content item at a slower rate. The user 102 is not affected.

If, on the other hand, the user 102 is viewing the media content item during the download, then a bandwidth-restriction condition may cause video "starvation." This means that the personal communications device 104 has not yet received a portion of the media content item by the time at which that portion needs to be displayed to the user 102. In this case, the presentation to the user 102 can be annoyingly paused. Once the device 104 has been able to download, in the face of the bandwidth restriction, some more of the media content item, the presentation can be resumed. The result for the user 102 is an annoyingly jerky, on and off again, presentation.

As a second example of a condition that can arise, the personal communications device 104 may be doing other tasks in addition to downloading and presenting the 3D media content item. If so, then the device 104 may not have enough internal resources (e.g., memory and processing power) to do everything it is asked to do while keeping up with decoding and presenting the 3D media content item to the user 102. In this situation, the bandwidth is not restricted, so the device 104 may be downloading the media content item at an acceptable rate, but the effect on the user 102 is similar to that in the bandwidth-restriction situation described above: The presentation may pause until the device 104 has enough resources to continue decoding and presenting.

With these and with other possible conditions, the presentation of the media content item to the user 102 becomes an annoying experience. The techniques presently disclosed aim to alleviate the effects on the user 102 of these conditions and thus remove this annoyance.

Figure 2:
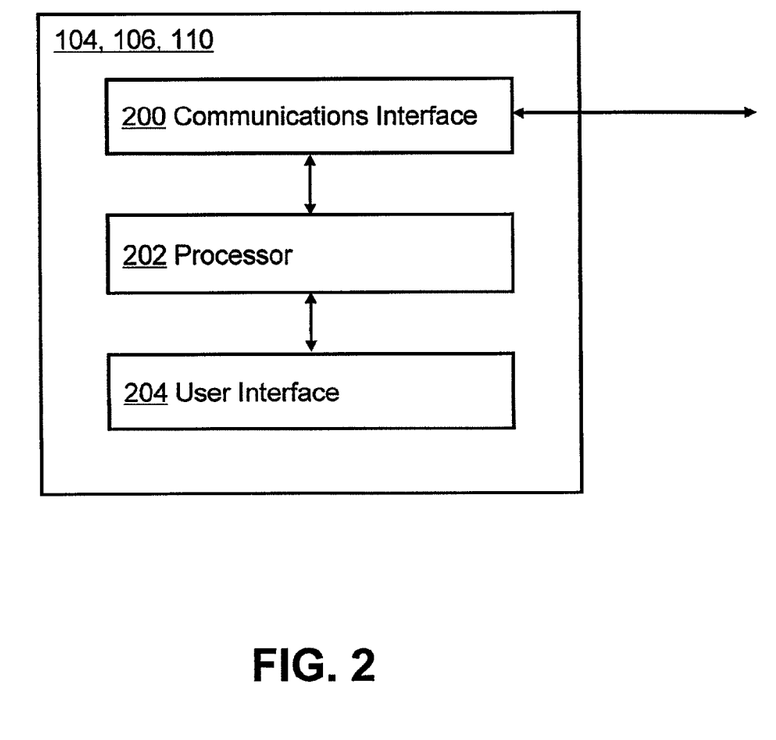
FIG. 2 is a schematic diagram of a representative personal communications device or media server.
Figure 3:
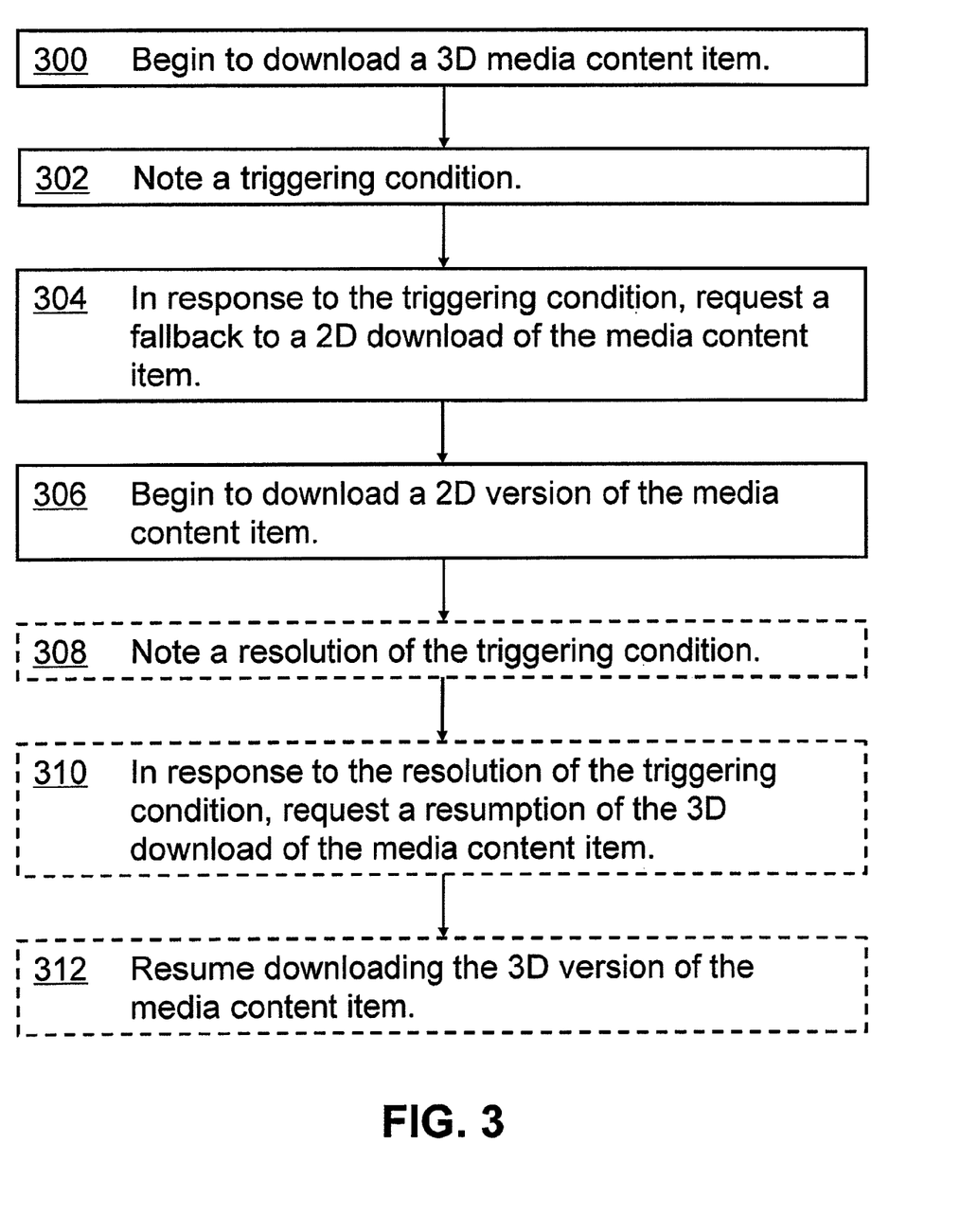
FIG. 3 is a flowchart of a method for falling back from a 3D to a 2D media download.
Figure 4A:
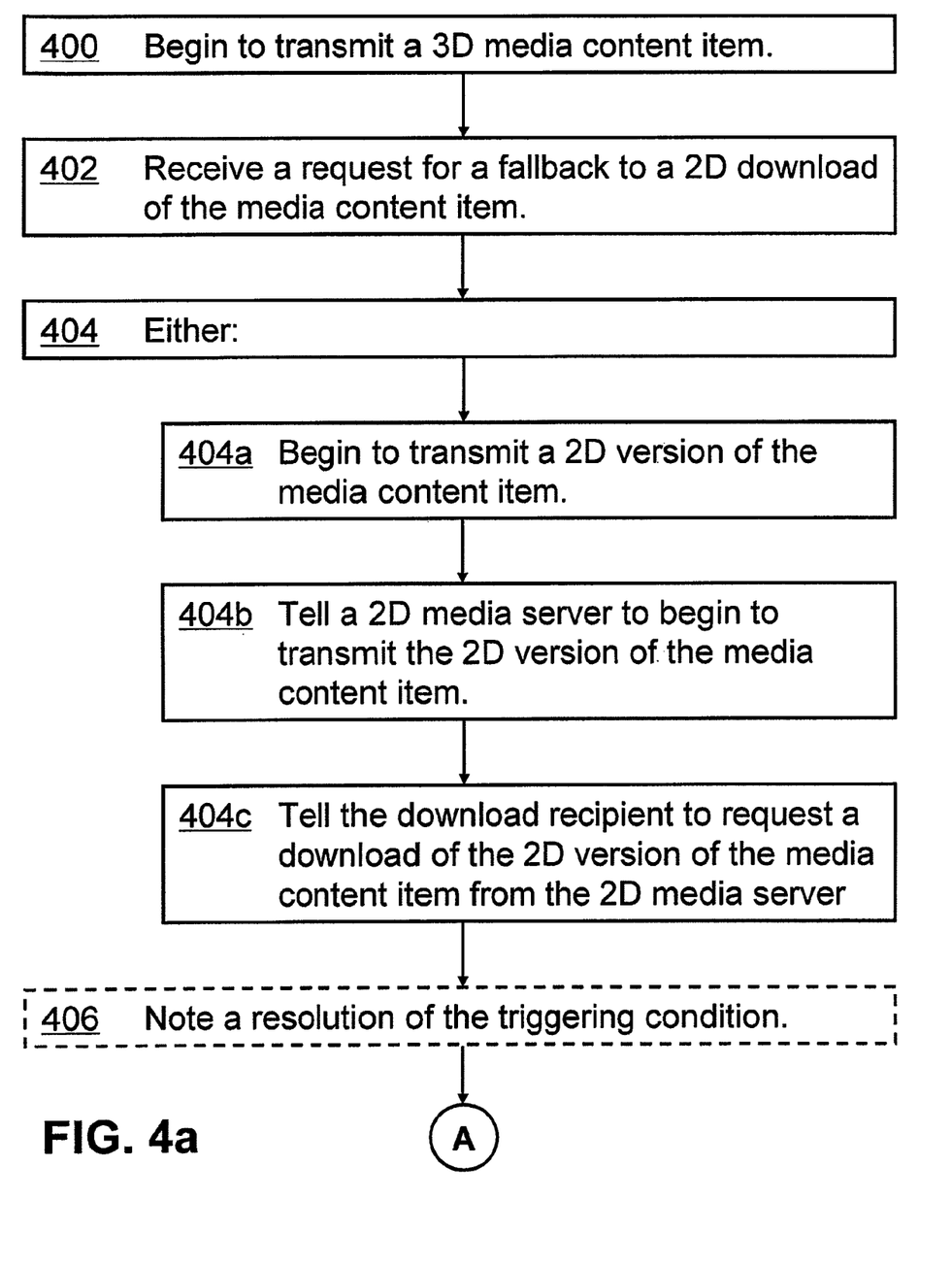
FIGS. 4*a* and 4*b* together form a flowchart of a method for a 3D media server to support fallback and to reinstate a 3D media download once a fallback-triggering condition has been resolved.
Figure 4B:
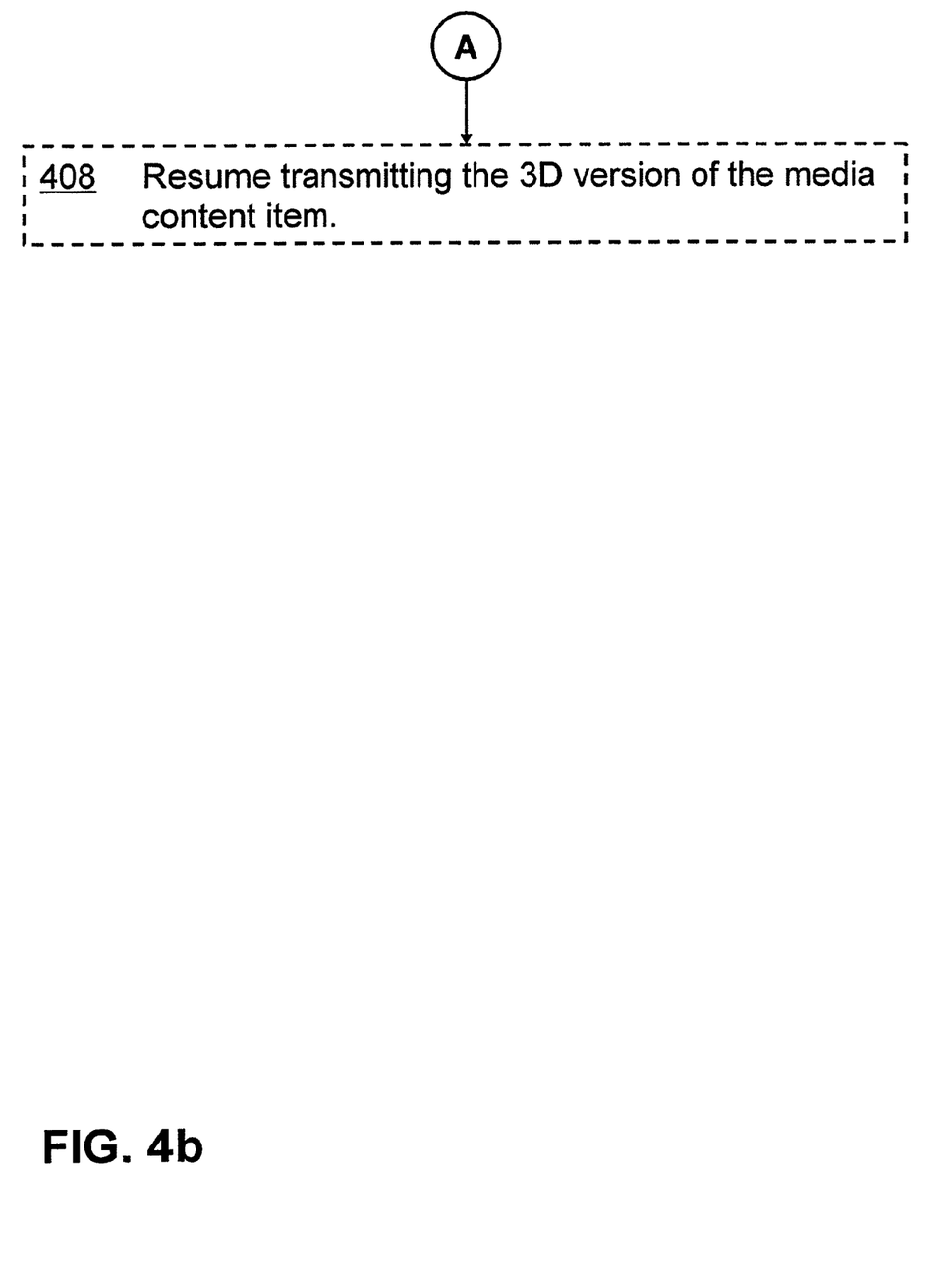

FIG. 2 shows the major internal components of a representative personal communications device 104 (e.g., a mobile telephone, personal digital assistant, tablet computer, personal computer, or gaming console) or media server 106, 110. (The media servers 106, 110 may be implemented on a media-restreaming device or on a plurality of servers working together or may be in the Internet "cloud.") Communications interfaces 200 send and receive media content items, related information, and download requests. A processor 202 controls the operations of the device 104, 106, 110 and, in particular, supports aspects of the present invention as illustrated in FIGS. 3 and 4, discussed below. The user interface 204 supports a user's (or administrator's) interactions with the device 104, 106, 110. A typical user interface of the personal communications device 104 includes a display for media content items, a keypad, and other user-input devices. The keypad may be physical or virtual, involving virtual keys displayed on a touch screen. Specific uses of these components by specific devices are discussed as appropriate below.

FIG. 3 presents a representative method usable by the personal communications device 104 for falling back from a 3D download to a 2D download of the same media content item. The method begins in step 300 when the device 104 begins to download a 3D media content item from the 3D-media server 106. Methods and protocols for such a download are well known in the art.

During the download, a triggering condition is noted by the personal communications device 104 (step 302). Many sorts of triggering conditions are possible. A number of possible triggers, discussed above with reference to FIG. 1, suggest network congestion and thus a limitation in the bandwidth available for the download. Here, the device 104 is concerned that the bandwidth available to it may not be sufficient to keep pace with the 3D presentation, that is to say, the download may proceed so slowly that the presentation of the media content item to the user 102 may be "starved" and have to pause.

Different protocols and different network technologies support different mechanisms by which congestion can be determined. In some cases, packets are dropped if they cannot be delivered in a timely fashion, so the number of dropped packets suggests congestion. More directly, the arrival rate of data for the media content item can be compared against the presentation rate. If the arrival rate is too low, then data are being presented faster than they can be received, a situation that can only last until the data cached in the receive buffers on the personal communications device 104 run dry. Some networks support a "Quality of Service" (QoS) parameter for a download. If the QoS is set too low (for whatever reason), then the delivery rate of the media content item may be too low.

Some modern networks support a specific "Congestion Experienced" notification in delivered packets. This notification tells the receiving personal communications device 104 that the network is congested somewhere between the 3D-media server 106 and the device 104.

To avoid hysteresis (that is, to avoid setting and resetting the trigger too often), the triggering condition may only be set only if a condition persists for a threshold amount of time or for a threshold number of separate incidents (e.g., a certain number of Congestion Experienced packets received consecutively).

Note that the above described network congestion conditions do not necessarily set the trigger in step 302. If, for example, the user 102 is only downloading the media content presentation in step 300 but is not currently watching it, then network congestion, although it slows down the download, does not directly affect the user's experience, and the remaining method of FIG. 3 need not be invoked.

A second set of possible triggering conditions, also mentioned above in reference to FIG. 1, involve starvation of resources local to the personal communications device 104. Other tasks running on the device 104 can consume the same resources that are needed for the download. 3D downloads require, for example, a significant amount of memory buffer space. More space and significant processing power are required for decoding and presenting the 3D media content item to the user 102. Thus the trigger can be set if the device 104 is concerned that it does not have enough internal resources to either download the media content item or to decode and present it (if the content item is currently being presented to the user 102).

In step 304, the personal communications device 104 responds to the trigger by requesting that the 3D download stop and be replaced with a download of a 2D version of the same media content item. The request is sent to the 3D-media server 106.

The reasoning behind this fallback is the simple fact that the 2D download requires less bandwidth, less storage space, and less processing power (when it is decoded and presented) than does the 3D download. Thus, the fallback is a useful strategy for dealing with conditions of limited bandwidth or conditions of shortages of internal resources on the device 104.

(If the media content item is currently being presented to the user 102, and if the triggering condition is due to a shortage of local resources, then the device 104 can begin displaying the media content item in 2D even before the 2D stream begins, that is, the device 104 can strip off the 3D enhancements from the 3D data already received. All 3D encoding techniques allow the device 104 to extract a 2D version from the 3D version quite easily.)

In most embodiments, the request in step 304 includes an indication of where in the media content item to begin the 2D download. That is, the 2D download normally does not begin at the beginning of the media content item but at a point roughly corresponding to the point in the download at which the trigger was set.

In some embodiments, the request can include information about the triggering condition that led to the request. The use of this optional information is discussed below in reference to step 406 of FIG. 4*a*.

In response to the request, the personal communications device 104 begins to receive the 2D version of the media content item from a 2D-media server 110 in step 306. In some cases the 3D-106 and 2D-media server 110 are the same device. In other cases, they are distinct devices.

Note that if the user 102 is viewing the media presentation during the download, then it is expected that the presentation will switch from 3D to 2D, the switch being made as seamlessly as possible. That said, the user 102 should notice that the 3D effects have dropped out of the presentation.

Different video encoding methods create different relationships between a 3D media content item and the 2D version of the same item. In some cases, the 3D version includes one data stream that is identical to the 2D version and a second data stream that encodes only the differences between the two images that make up the 3D view. In other cases, the first stream is the 2D version, while the second stream is a depth map for the entire scene. Other encoding methods are possible, and the methods of FIGS. 3 and 4 support them all.

Optional steps 308 through 312 address the case where the triggering condition is resolved, and the personal communications device 104 reverts to the 3D download. It is important to note that, if the media content item is being presented to the user 102, then switching too often between 3D and 2D could become more annoying than simply leaving the presentation in 2D. The above discussion of "hysteresis" applies here as well to avoid this frequent switching.

FIGS. 4*a* and 4*b* present the fallback from the point of view of the 3D-media server 106. In step 400, the server 106 is sending the 3D media content item to the personal communications device 104.

In step 402, the 3D-media server 106 receives the fallback request (sent in step 304 of FIG. 3) and responds by beginning to send the 2D version of the media content item in step 404. If (as discussed above) the request includes the point at which to begin the 2D download, then the download begins at that point, otherwise the 2D download begins at the beginning of the media content item.

Step 404 includes three alternatives. Step 404*a* covers the case in which the 3D-media server 106 also serves as the 2D-media server 110. When the servers 106, 110 are distinct devices, a first alternative is step 404*b* where the 3D-media server 106 tells the 2D-media server 110 to begin the 2D download (including telling it where to begin, if the original fallback request includes that information). In the second alternative of step 404*c*, the 3D-media server 106 tells the personal communications device 104 to request the 2D download from the 2D-media server 110.

As discussed above, in some embodiments the fallback request message includes information about the triggering condition that led the personal communications device 204 to request the fallback. If that is the case, then the 3D-media server 106 can monitor conditions and may be able to see that the triggering condition has been resolved (step 406). If, for example, the triggering condition was network congestion, then the server 106 may be able to tell that the congestion has cleared up. If, for example, the trigger was based on a number of Congestion Experienced notifications, then receiving a number of consecutive non-Congestion Experienced packets may mean that the condition has been resolved.

Note that in some situations, it is unlikely that the 3D-media server 106 will be able to determine by itself that the trigger condition has been resolved. If, for example, the triggering condition is based on a shortage of local resources on the personal communications device 104, then the server 106 would not know of a resolution until the device 104 requests a resumption of the 3D download (in step 310 of FIG. 3).

If the 3D-media server 106 determines that the triggering condition has been resolved in step 406, then it resumes the 3D download in step 408 of FIG. 4*b*.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for a personal communications device to fall back from receiving a three-dimensional (3D) version of a media content item to a two-dimensional (2D) version of the media content item, the method comprising:
   receiving, by the personal communications device from a 3D-media server, at least a portion of the 3D version of the media content item;
   identifying a triggering condition in connection with the 3D version of the media content item;
   sending, by the personal communications device to the 3D-media server, in response to the triggering condition at a first point in the 3D version of the media content item, a fallback message requesting that at least a portion of the 2D version of the media content item be sent to the personal communications device instead of the 3D version, wherein the fallback message specifies a second point in the media content item at which the 2D version of the media content item is to be sent based on the first point in the 3D version of the media content item and contains information about the triggering condition;
   initiating monitoring, by the 3D-media server, the triggering condition based on the fallback message; and
   receiving, by the personal communications device from a 2D-media server, at least a portion of the 2D version of the media content item.

2. The method of claim 1, wherein the triggering condition comprises a buffer utilization on the personal communications device exceeding a threshold.

3. The method of claim 1, wherein the triggering condition comprises a processing utilization on the personal communications device exceeding a threshold.

4. The method of claim 1, wherein the triggering condition comprises a rate of dropped packets exceeding a threshold.

5. The method of claim 1, wherein the triggering condition comprises a delivery rate of the 3D version of the media content item dropping below a threshold.

6. The method of claim 1, wherein the triggering condition comprises receiving more than a threshold number of consecutive Congestion Experienced notifications.

7. The method of claim 1, wherein the triggering condition comprises a quality-of-service parameter set below a threshold.

8. The method of claim 1, wherein the triggering condition comprises a condition that persists for at least a specified threshold time.

9. The method of claim 1, wherein the triggering condition comprises encountering at least a threshold number of incidents.

10. The method of claim 1, wherein the fallback message specifies a point in the media content item at which the 2D version of the media content item should begin to be sent.

11. The method of claim 1, wherein the 2D-media server is the 3D-media server.

12. The method of claim 1, wherein the 2D-media server is distinct from the 3D-media server.

13. The method of claim 1, further comprising:
presenting a second portion of the 2D version of the media content item on the personal communications device, the second portion of the 2D version of the media content item being derived from the 3D version of the media content item, wherein the presentation of the second portion of the 2D version of the media content item is initiated prior to receiving the portion of the 2D version of the media content item from the 2D-media server.

14. A personal communications device configured to fall back from receiving a 3D version of a media content item to a 2D version of the media content item, the personal communications device comprising:
a communications interface; and
a processor operatively connected to the communications interface and configured to:
receive, via the communications interface from a 3D-media server, at least a portion of the 3D version of the media content item;
identify a triggering condition in connection with the portion of the 3D version of the media content item;
send, via the communications interface to the 3D-media server, in response to the triggering condition at a first point in the 3D version of the media content item, a fallback message requesting that at least a portion of the 2D version of the media content item be sent to the personal communications device instead of the 3D version, wherein the fallback message specifies a second point in the media content item at which the 2D version of the media content item is to be sent based on the first point in the 3D version of the media content item and contains information about the triggering condition, wherein the triggering condition is monitored by the 3D-media server based on the fallback message;
receive, via the communications interface from a 2D-media server, at least a portion of the 2D version of the media content item.

15. The personal communications device of claim 14, wherein the personal communications device is selected from a group comprising: a mobile telephone, a personal digital assistant, a personal computer, a tablet computer, and a gaming console.

16. A method for a 3D-media server to allow a personal communications device to fall back from receiving a 3D version of a media content item to a 2D version of the media content item, the method comprising:
sending, by the 3D-media server to the personal communications device, at least a portion of the 3D version of the media content item;
receiving, by the 3D-media server from the personal communications device, a fallback message comprising triggering condition information at a first point in the 3D version of the media content item requesting that at least a portion of the 2D version of the media content item be sent to the personal communications device instead of the 3D version, wherein the fallback message specifies a second point in the media content item at which the 2D version of the media content item is to be sent based on the first point in the 3D version of the media content item and contains information about the triggering condition, wherein the 3D version of the media content item is being presented by the personal communications device;
initiating monitoring, by the 3D-media server, the triggering condition based on the fallback message; and
sending, by the 3D-media server, an element selected from the group consisting of: at least a portion of the 2D version of the media content item to the personal communications device, a request to a 2D-media server that the 2D-media server send at least a portion of the 2D version of the media content item to the personal communications device, and a message to the personal communications device redirecting the personal communications device to a 2D-media server.

17. The method of claim 16, wherein the fallback message comprises information associated with the local resource shortage.

18. The method of claim 16, further comprising:
resuming sending, by the 3D-media server to the personal communications device, at least a portion of the 3D version of the media content item, the resuming based, at least in part, on a resolution of a triggering condition.

19. The method of claim 18,
wherein the triggering condition comprises receiving, by the personal communications device, more than a threshold number of consecutive Congestion Experienced notifications; and
wherein the resolution comprises receiving, by the 3D-media server, more than a threshold number of consecutive non-Congestion Experienced notifications.

20. The method of claim 16, wherein the fallback message specifies a point in the media content item at which the 2D version of the media content item should begin to be sent.

21. A 3D-media server configured to allow a personal communications device to fall back from receiving a 3D version of a media content item to a 2D version of the media content item, the 3D-media server comprising:
a communications interface; and
a processor operatively connected to the communications interface and configured for:
sending, via the communications interface to the personal communications device, at least a portion of the 3D version of the media content item;
receiving, via the communications interface from the personal communications device, a fallback message comprising triggering condition information associated with a local resource shortage at a first point in the 3D version of the media content item requesting that at least a portion of the 2D version of the media content item be sent to the personal communications device instead of the 3D version, wherein the fallback message specifies a second point in the media content item at which the 2D version of the media content item is to be sent based on the first point in the 3D version of the media content item and contains information about the triggering condition, wherein the 3D version of the media content item is being presented by the personal communications device;
initiating monitoring, via the communications interface, the triggering condition based on the fallback message; and
sending, via the communications interface, an element selected from the group consisting of: at least a portion of the 2D version of the media content item to the personal communications device, a request to a 2D-media server that the 2D-media server send at least a portion of the 2D version of the media content item to the personal communications device, and a message to the personal communications device redirecting the personal communications device to a 2D-media server.

22. The 3D-media server of claim 21, wherein the 3D-media server is selected from a group comprising: a media-restreaming device, a server, and a plurality of servers.

* * * * *